(12) United States Patent
Kamiya et al.

(10) Patent No.: US 10,267,378 B2
(45) Date of Patent: *Apr. 23, 2019

(54) SEALING STRUCTURE

(71) Applicant: NOK CORPORATION, Tokyo (JP)

(72) Inventors: Yusuke Kamiya, Fukushima (JP); Hiroki Matsui, Fukushima (JP); Shinya Omoto, Tottori (JP); Toru Nakashima, Tottori (JP)

(73) Assignee: NOK CORPORATION, Tokyo (JP)

( * ) Notice: Subject to any disclaimer, the term of this patent is extended or adjusted under 35 U.S.C. 154(b) by 136 days.

This patent is subject to a terminal disclaimer.

(21) Appl. No.: 15/504,478

(22) PCT Filed: Aug. 7, 2015

(86) PCT No.: PCT/JP2015/072459
§ 371 (c)(1),
(2) Date: Feb. 16, 2017

(87) PCT Pub. No.: WO2016/027695
PCT Pub. Date: Feb. 25, 2016

(65) Prior Publication Data
US 2018/0223949 A1 Aug. 9, 2018

(30) Foreign Application Priority Data

Aug. 20, 2014 (JP) ................... 2014-167168

(51) Int. Cl.
*F16J 15/16* (2006.01)
*F16F 15/16* (2006.01)
(Continued)

(52) U.S. Cl.
CPC .......... *F16F 15/165* (2013.01); *F16F 15/126* (2013.01); *F16J 15/32* (2013.01);
(Continued)

(58) Field of Classification Search
CPC .... F16F 15/165; F16F 15/126; F16F 2230/30; F16J 15/3236; F16J 15/3264; F16J 15/16; F16J 15/12; F16J 15/32
(Continued)

(56) References Cited

U.S. PATENT DOCUMENTS 5,183,269 A * 2/1993 Black ...................... F16C 33/76
277/349
5,186,472 A * 2/1993 Romero ............... F16J 15/3256
277/351
(Continued)

FOREIGN PATENT DOCUMENTS

CN 201103685 Y 8/2008
CN 201502706 U 6/2010
(Continued)

OTHER PUBLICATIONS

Chinese Office Action dated Jul. 6, 2017 with English translation.
(Continued)

*Primary Examiner* — Nathan Cumar
(74) *Attorney, Agent, or Firm* — Harness, Dickey & Pierce, P.L.C.

(57) ABSTRACT

A sealing structure allows for formation of a labyrinth structure between an oil seal and a torsional vibration damper even when the oil seal does not include a side lip. The oil seal 100 includes an oil lip 121 provided such as to be slidable on an outer circumferential surface of a tubular part 210, and a dust lip 122 provided further on an air side (A) than the oil lip 121 and slidable on the outer circumferential surface of the tubular part 210. An annular member 250 is further provided, which is fixed to the outer circumferential surface of the tubular part 210 further on the air side (A) than the dust lip 122 and covering an outer circumferential surface of the dust lip 122 such that there is a gap (Continued)

between the annular member 250 itself and the outer circumferential surface of the dust lip 122.

2 Claims, 3 Drawing Sheets

(51) Int. Cl.
    *F16F 15/126*     (2006.01)
    *F16J 15/32*     (2016.01)
    *F16J 15/3264*     (2016.01)
    *F16J 15/3236*     (2016.01)

(52) U.S. Cl.
    CPC ....... *F16J 15/3236* (2013.01); *F16J 15/3264* (2013.01); *F16F 2230/30* (2013.01)

(58) Field of Classification Search
    USPC .......................................................... 277/567
    See application file for complete search history.

(56) References Cited

U.S. PATENT DOCUMENTS

| | | | |
|---|---|---|---|
| 5,553,866 A * | 9/1996 | Heinzen | F16J 15/3264 277/551 |
| 6,357,757 B1 | 3/2002 | Hibbler et al. | |
| 2010/0244388 A1 * | 9/2010 | Nakagawa | F16J 15/3264 277/559 |
| 2011/0221140 A1 | 9/2011 | Nakagawa | |
| 2013/0175764 A1 * | 7/2013 | Hamamoto | F16J 15/3232 277/562 |
| 2015/0285379 A1 | 10/2015 | Matsui et al. | |

FOREIGN PATENT DOCUMENTS

| | | |
|---|---|---|
| CN | 201827371 U | 5/2011 |
| EP | 0520181 A1 | 12/1992 |
| JP | H03-020175 A | 1/1991 |
| JP | 2011-241891 A | 12/2011 |
| JP | 2012-082898 A | 4/2012 |
| JP | WO2014/021179 A1 | 2/2014 |
| JP | 2014-126105 A | 7/2014 |
| WO | 2010/061688 A1 | 6/2010 |

OTHER PUBLICATIONS

Chinese Office Action dated Dec. 19, 2017 with English translation (corresponding to CN201580044327.1).
Extended European Search Report dated Mar. 19, 2018 (corresponding to EP15833995.2).
Korean Office Action dated Feb. 2, 2018 (corresponding to KR 10-2017-7004272).

* cited by examiner

SEALING STRUCTURE

CROSS-REFERENCE TO RELATED APPLICATIONS

This application is a National Stage of International Application No. PCT/JP2015/072459, filed Aug. 7, 2015 (now WO 2016/027695A1), which claims priority to Japanese Application No. 2014-167168, filed Aug. 20, 2014. The entire disclosures of each of the above applications are incorporated herein by reference.

FIELD

The present disclosure relates to a sealing structure that has a torsional vibration damper.

BACKGROUND

In a sealing structure that has a torsional vibration damper and an oil seal, a technique of providing a labyrinth structure has hitherto been known for minimizing entrance of foreign substances from outside. One example of such a structure will be described with reference to FIG. 3. FIG. 3 is a schematic cross-sectional view of a sealing structure according to a prior art example.

As shown in the figure, the torsional vibration damper 600 includes a tubular part 610 that is attached to a crankshaft 300. The oil seal 500 includes an oil lip 510 provided such as to be slidable on an outer circumferential surface of the tubular part 610, and a dust lip 520 provided further on the opposite side from the sealed-fluid side than the oil lip 510 and slidable on the outer circumferential surface of the tubular part 610.

In this prior art example, a side lip 530 is provided to the oil seal 500. An annular groove 621 is formed in a body part 620 of the torsional vibration damper 600, and the side lip 530 is disposed such as to extend into this annular groove 621. This way, a confined and complex path is formed from the air side to a sliding part between the dust lip 520 and the outer circumferential surface of the tubular part 610. A labyrinth structure is thus provided.

However, in some cases where the difference between the inner diameter and the outer diameter of the oil seal 500 needs to be small, the side lip 530 cannot be provided in the prior art example described above. In such cases, the labyrinth structure that makes use of the side lip 530 cannot be adopted.

CITATION LIST

Patent Literature

[PTL 1] Japanese Patent Application Laid-open No. 2011-241891

SUMMARY

Technical Problem

An object of the present disclosure is to provide a sealing structure that allows for formation of a labyrinth structure between an oil seal and a torsional vibration damper even when the oil seal does not include a side lip.

Solution to Problem

The present disclosure adopted the following means to solve the problem noted above.

Namely, the sealing structure of the present disclosure is a sealing structure including a torsional vibration damper having a tubular part to be attached to a crankshaft, and an oil seal that seals an annular gap between an inner circumferential surface of a shaft hole in a housing for the crankshaft to pass through and an outer circumferential surface of the tubular part.

The oil seal includes an oil lip provided such as to be slidable on the outer circumferential surface of the tubular part, and a dust lip provided further on an opposite side from a sealed-fluid side than the oil lip and slidable on the outer circumferential surface of the tubular part.

An annular member is further provided, which is fixed to the outer circumferential surface of the tubular part further on the opposite side from the sealed-fluid side than the dust lip and covering an outer circumferential surface of the dust lip such that there is a gap between the annular member itself and the outer circumferential surface of the dust lip.

According to the present disclosure, an annular member is provided, which covers the outer circumferential surface of the dust lip such that there is a gap between the annular member itself and the outer circumferential surface of the dust lip. Therefore, a confined and complex path can be formed from a point on the opposite side from the sealed-fluid side to the sliding part between the dust lip and the outer circumferential surface of the tubular part. Namely, a labyrinth structure can be provided. According to the present disclosure, a labyrinth structure can be provided this way between the oil seal and the torsional vibration damper even when the oil seal is not provided with a side lip.

Preferably, the annular member may include a cylindrical part fixed to the outer circumferential surface of the tubular part, and a tapered part of which diameter increases from an end on the sealed-fluid side of the cylindrical part toward the sealed-fluid side.

An inner circumferential surface of the tapered part and the outer circumferential surface of the dust lip may face each other, with a gap being formed therebetween.

Advantageous Effects of the Disclosure

As described above, according to the present disclosure, a labyrinth structure can be provided between the oil seal and the torsional vibration damper even when the oil seal is not provided with a side lip.

DRAWINGS

DETAILED DESCRIPTION

Modes for carrying out this disclosure will be hereinafter illustratively described in detail based on a specific embodiment with reference to the drawings. It should be noted that, unless otherwise particularly specified, the sizes, materials, shapes, and relative arrangement or the like of constituent components described in the embodiment are not intended to limit the scope of this disclosure.

Embodiment

The sealing structure according to an embodiment of the present disclosure will be described with reference to FIG.

Figure 1:
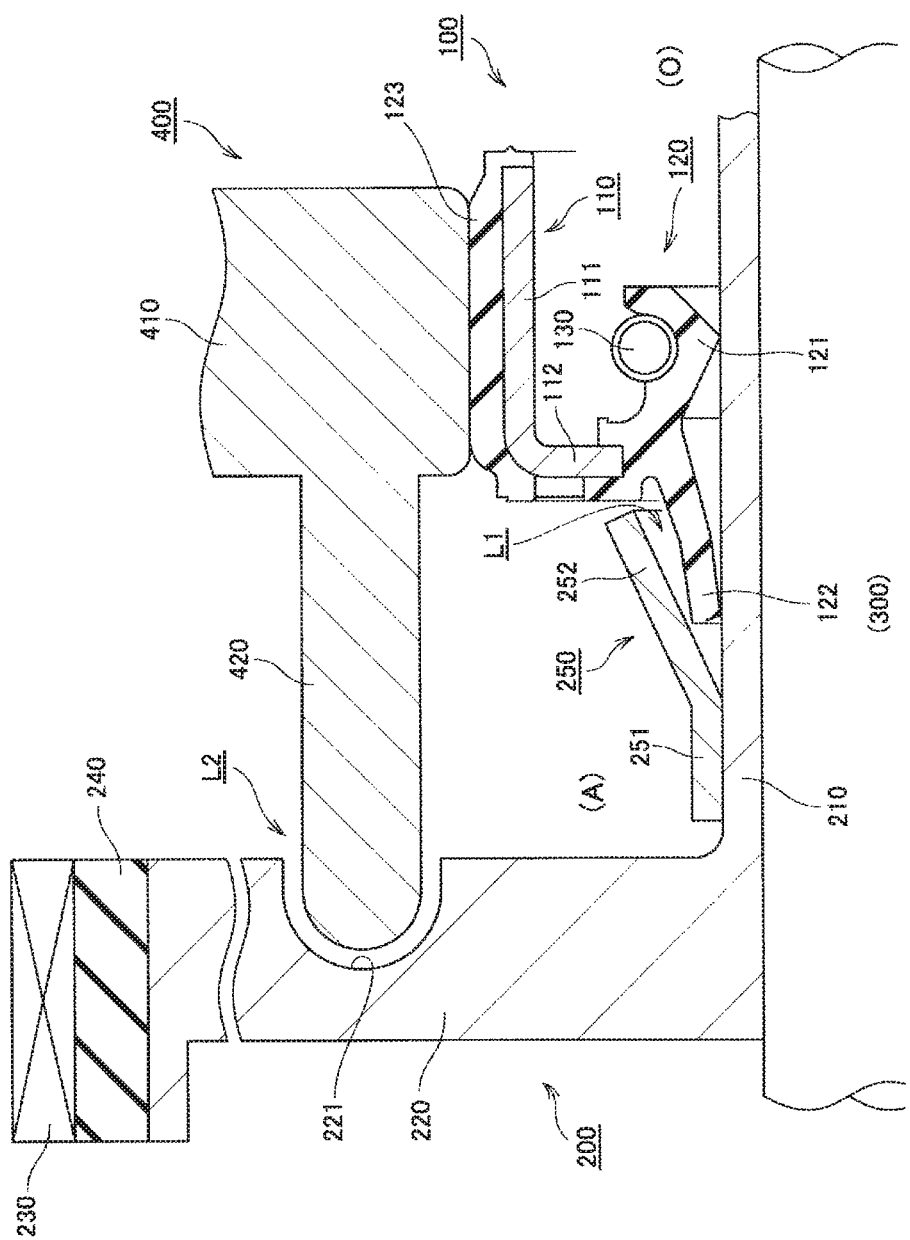
FIG. 1 is a schematic cross-sectional view of a sealing structure according to an embodiment of the present disclosure.
Figure 2:
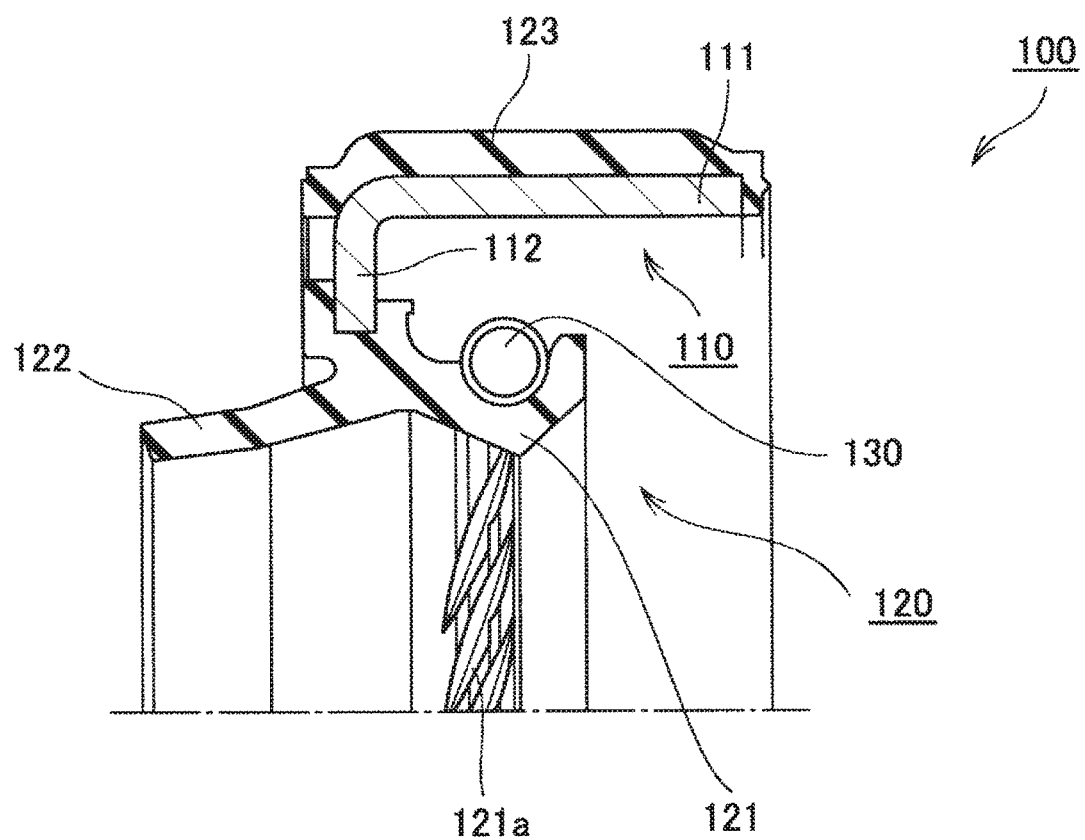
FIG. 2 is a schematic cross-sectional view of an oil seal according to the embodiment of the present disclosure.
Figure 3:
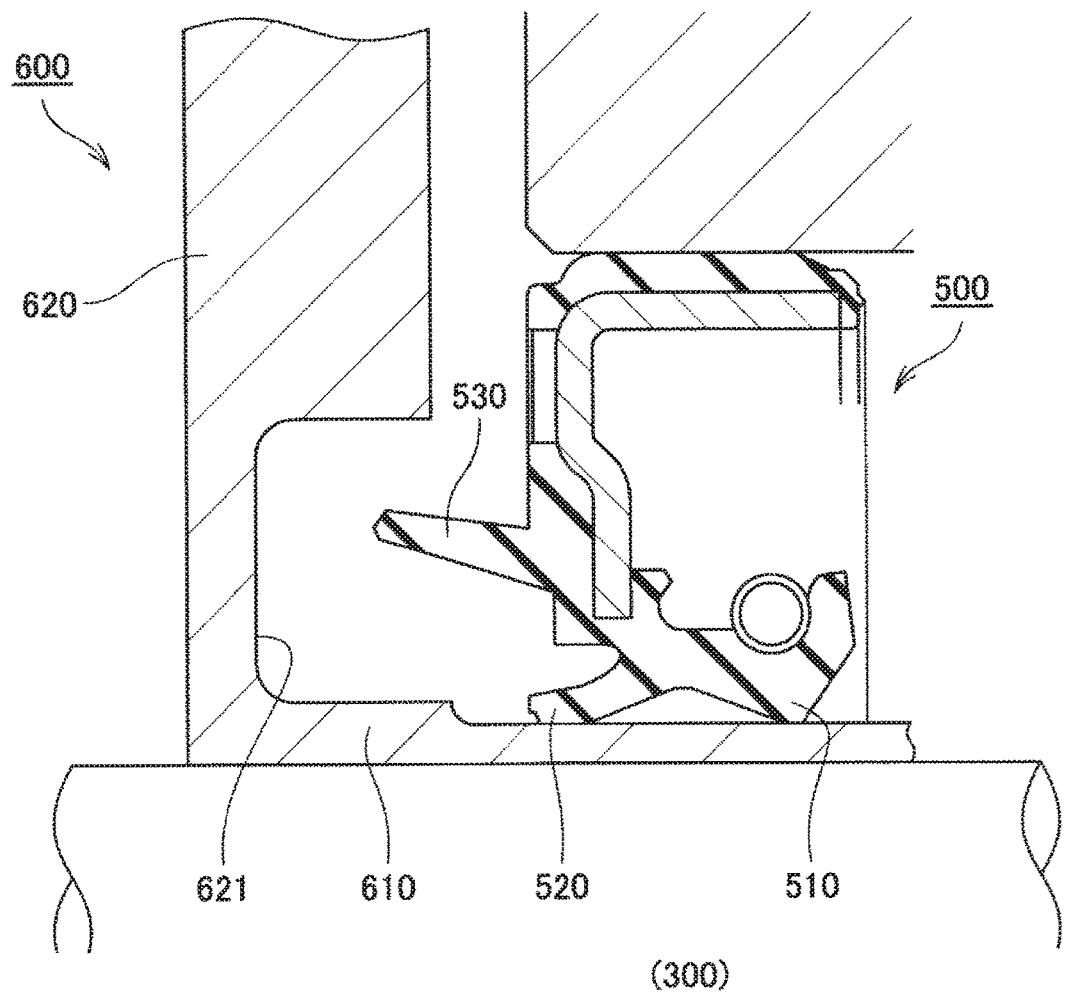
FIG. 3 is a schematic cross-sectional view of a sealing structure according to a prior art example.

1 and FIG. 2. FIG. 1 is a schematic cross-sectional view of the sealing structure according to the embodiment of the present disclosure. It is a cross-sectional view of a plane that contains the center axis of a crankshaft. FIG. 1 shows a simplified form of a torsional vibration damper. FIG. 2 is a schematic cross-sectional view of an oil seal according to the embodiment of the present disclosure. It is a cross-sectional view of a plane that contains the center axis of the oil seal, which has a substantially rotationally symmetrical shape.

<Sealing Structure>

The entire configuration of the sealing structure according to this embodiment will be described with reference to FIG. 1 in particular. The sealing structure according to this embodiment includes an oil seal 100, a torsional vibration damper 200 attached to a crankshaft 300, and a front cover 400 as a housing.

The torsional vibration damper 200 is an energy absorbing device attached to the crankshaft 300 for preventing the torsional vibration amplitude from becoming too large. The torsional vibration damper 200 has an annular body part 220 and a cylindrical tubular part 210 on the inner peripheral side of the body part 220 to be attached to the crankshaft 300. An annular weight 230 made of metal, and an annular elastic member 240 made of an elastic material such as rubber for coupling the body part 220 and the annular weight 230 are provided on the outer peripheral side of the body part 220. These annular weight 230 and annular elastic member 240 provide the function of restricting the torsional vibration amplitude of the crankshaft 300.

The oil seal 100 serves the function of sealing an annular gap between the inner circumferential surface of a shaft hole in the front cover 400 for the crankshaft 300 to pass through and the outer circumferential surface of the tubular part 210 of the torsional vibration damper 200. More specifically, the oil seal 100 serves the function of minimizing leakage of oil, which is a fluid to be sealed, from a sealed-fluid side (O) to an air side (A) that is the opposite side from the sealed-fluid side (O), and of minimizing entrance of foreign substances such as dust or dirt from the air side (A) to the sealed-fluid side (O).

<Oil Seal>

The oil seal 100 will be described in more detail with reference to FIG. 1 and FIG. 2. The oil seal 100 includes a metal reinforcing ring 110 and a sealing body 120 made of an elastic material such as rubber and formed integrally with the reinforcing ring 110. The oil seal 100 may be obtained by forming the sealing body 120 by insert molding, with the reinforcing ring 110 as the insert component.

The reinforcing ring 110 includes a cylindrical part 111 and an inward flange part 112 provided on the air side (A) of the cylindrical part 111. The sealing body 120 integrally includes an oil lip 121 and a dust lip 122 that are slidable on the outer circumferential surface of the tubular part 210 of the torsional vibration damper 200, and an outer circumferential sealed portion 123 that makes tight contact with an inner circumferential surface of the shaft hole in the front cover 400. The oil lip 121 is formed to extend from near the tip of the inward flange part 112 of the reinforcing ring 110 radially inward and toward the sealed-fluid side (O). A plurality of thread grooves 121a are formed in the inner circumferential surface of the oil lip 121, which provide the pumping effect for returning leaked oil back to the sealed-fluid side (O). In addition, a garter spring 130 is mounted on the outer circumferential side of this oil lip 121 for applying a force radially inward so that the oil lip 121 will not separate from the outer circumferential surface of the tubular part 210. The dust lip 122 is formed to extend from near the tip of the inward flange part 112 radially inward and toward the air side (A).

<Labyrinth Structure>

The labyrinth structure provided in the sealing structure according to this embodiment will be described with reference to FIG. 1 in particular. In this embodiment, a metal annular member 250 is provided on an outer circumferential surface of the tubular part 210 of the torsional vibration damper 200. This annular member 250 is fixed to the outer circumferential surface of the tubular part 210 further on the air side (A) than the dust lip 122 and covers an outer circumferential surface of the dust lip 122 such that a gap is formed between the annular member 250 itself and the outer circumferential surface of the dust lip. More specifically, this annular member 250 includes a cylindrical part 251 fixed to the outer circumferential surface of the tubular part 210, and a tapered part 252 of which diameter increases from one end on the sealed-fluid side (O) of this cylindrical part 251 toward the sealed-fluid side (O). The annular member 250 is provided to the tubular part 210 such that the inner circumferential surface of the tapered part 252 and the outer circumferential surface of the dust lip 122 face each other, and that there is a gap formed between them.

This way, the gap between the tapered part 252 of the annular member 250 and the dust lip 122 forms a confined and complex path from the air side (A) to the sliding part between the dust lip 122 and the outer circumferential surface of the tubular part 210. A first labyrinth structure L1 is thus provided.

In the sealing structure according to this embodiment, the front cover 400 includes an annular protrusion 420 that protrudes from its body part 410 toward the air side (A). An annular groove 221 is provided on the sealed-fluid side (O) of the body part 220 of the torsional vibration damper 200. The annular protrusion 420 of the front cover 400 is arranged such as to extend into this annular groove 221. This way, a confined and complex path is formed from the outer circumferential side to the inner circumferential side of the annular protrusion 420. A second labyrinth structure L2 is thus provided.

As the first labyrinth structure L1 and second labyrinth structure L2 are formed in this way, entrance of foreign substances such as dust or dirt into the sliding part between the dust lip 122 and the outer circumferential surface of the tubular part 210 can be minimized without involving an increase in torque. Thus the sealing function provided by the oil seal 100 can be consistently exhibited for a long time.

Advantages of the Sealing Structure According to this Embodiment

In the sealing structure according to this embodiment, a first labyrinth structure L1 is provided between the annular member 250 provided on the outer circumferential surface of the tubular part 210 of the torsional vibration damper 200 and the dust lip 122 of the oil seal 100. Therefore, with the sealing structure according to this embodiment, a labyrinth structure can be provided between the oil seal 100 and the torsional vibration damper 200 without forming a side lip to the oil seal 100. There is no need to form an annular groove in the torsional vibration damper which generally involves cumbersome processing, as would be required when a labyrinth structure is to be provided between a side lip and the torsional vibration damper. Since it is only necessary to mount (attach) the annular member 250 on the outer circumferential surface of the tubular part 210 according to this embodiment, the production cost can be reduced.

REFERENCE SIGNS LIST

100 Oil seal
110 Reinforcing ring
111 Cylindrical part
112 Inward flange part
120 Sealing body
121 Oil lip
122 Dust lip
123 Outer circumferential sealed portion
130 Garter spring
200 Torsional vibration damper
210 Tubular part
220 Body part
221 Annular groove
230 Annular weight
240 Annular elastic member
250 Annular member
251 Cylindrical part
252 Tapered part
300 Crankshaft
400 Front cover
410 Body part
420 Annular protrusion
500 Oil seal
L1 First labyrinth structure
L2 Second labyrinth structure

The invention claimed is:

1. A sealing structure comprising:
a torsional vibration damper having a tubular part to be attached to a crankshaft the tubular part including an outer cylindrical surface; and
an oil seal that seals an annular gap between an inner circumferential surface of a shaft hole in a housing for the crankshaft to pass through and the outer cylindrical surface of the tubular part,
the oil seal including an oil lip provided such as to be slidable on the outer cylindrical surface of the tubular part, and a dust lip provided further on an opposite side from a sealed-fluid side than the oil lip and slidable on the outer cylindrical surface of the tubular part, and
the sealing structure further comprising an annular member having a first portion fixed to the outer cylindrical surface of the tubular part further on the opposite side from the sealed-fluid side than the dust lip and having a second portion extending axially and radially outward from the first portion and having an inner circumferential surface directly overlapping an outer circumferential surface of the dust lip such that there is a gap between the second portion of the annular member itself and the outer circumferential surface of the dust lip.

2. The sealing structure according to claim 1, wherein the first portion of the annular member includes a cylindrical part that is fixed to the outer cylindrical surface of the tubular part, and the second portion of the annular member is a tapered part of which diameter increases from an end on the sealed-fluid side of the cylindrical part toward the sealed-fluid side, and wherein an inner circumferential surface of the tapered part and an outer circumferential surface of the dust lip face each other, with a gap being formed therebetween.

* * * * *